Feb. 13, 1962   R. H. DAVIES   3,020,924
AUTOMATIC SHUT-OFF VALVE
Filed Sept. 14, 1959
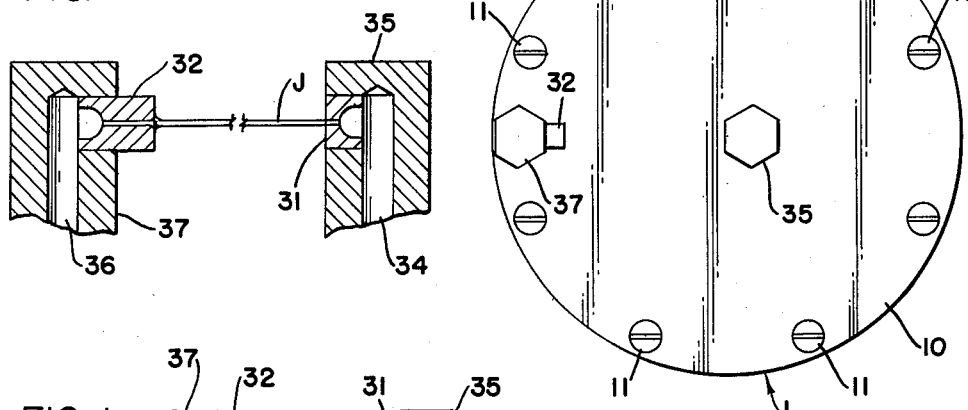
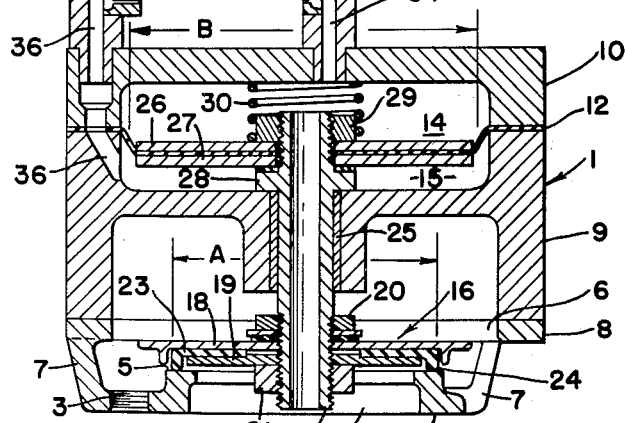
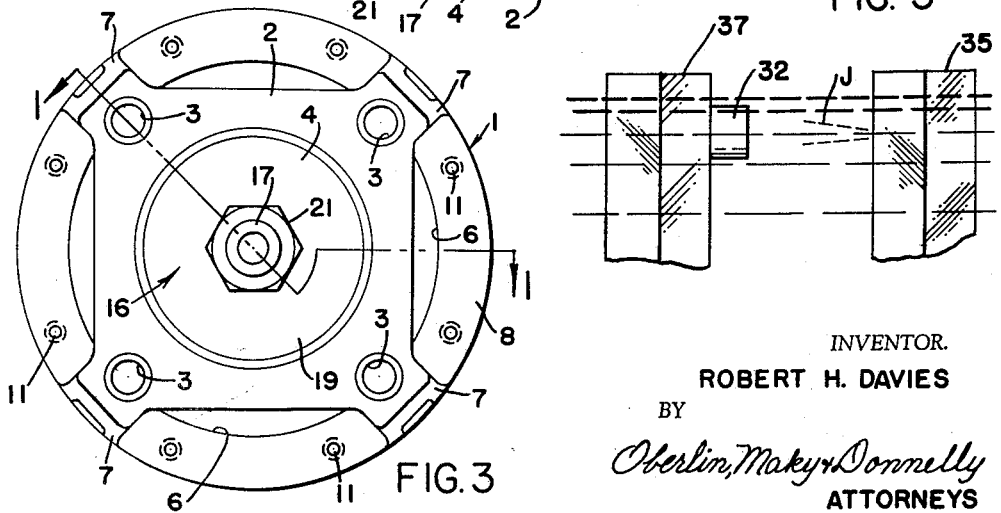
INVENTOR.
ROBERT H. DAVIES
BY
Oberlin, Maky & Donnelly
ATTORNEYS

United States Patent Office 3,020,924
Patented Feb. 13, 1962

3,020,924
AUTOMATIC SHUT-OFF VALVE
Robert H. Davies, Aurora, Ohio, assignor to Parker-Hannifin Corporation, Cleveland, Ohio, a corporation of Ohio
Filed Sept. 14, 1959, Ser. No. 839,823
11 Claims. (Cl. 137—386)

The present invention relates generally as indicated to an automatic shut-off valve and more particularly to a level control valve which is operative automatically to shut off the flow of liquid into a tank being filled in response to filling of the tank to a predetermined level.

The present invention is concerned primarily with a level control valve in which the predetermined liquid level in a tank is sensed by a jet device or transducer operative, during the filling operation, to transform the velocity head of a liquid jet into pressure energy that acts on the valve to maintain it in open position and operative, upon filling of the tank to a level submerging the jet, to decrease such pressure energy whereby the valve moves to closed position and thus prevents further flow of liquid into the tank.

It is a principal object of this invention to provide an automatic shut-off valve of the character indicated in which the pressure head derived from the velocity head of a jet keeps the valve open until the jet is submerged by the rising level of liquid in the tank being filled, at which time there is a substantial loss of pressure energy and consequent closing of the valve.

It is another object of this invention to provide an automatic shut-off valve of the character indicated which employs a simple form of jet assembly including a jet nozzle and a jet pickup or receiver, the latter being spaced from and aligned with the nozzle so that a jet of liquid issuing from the nozzle impinges on the receiver, the nozzle being in fluid communication with the valve inlet port and the receiver being in fluid communication with a valve chamber in which the pressure energy of the jet tends to keep the valve open. On the other hand, when the pressure energy in said valve chamber is decreased, owing to rising of the liquid in the tank to the level of the jet, the valve is moved to closed position to discontinue the tank-filling operation.

It is another object of this invention to provide an automatic shut-off valve which is of simplified form and economical to manufacture by reason of the fact that the varying pressure energy derived from the jet acts directly on the valve to control the opening and closing movements thereof without requiring pilot valves or the like.

It is another object of this invention to provide an automatic shut-off valve of the character indicated which has a pressure seating chamber and a pressure unseating chamber associated therewith, the seating chamber being in fluid communication with the pressure inlet port and pressurre therein being effective to tend to close the valve, and the unseating chamber deriving pressure energy from the jet receiver and tending to open the valve whereby when the pressure energy in the unseating chamber is relatively high (unimpeded impingement of jet on receiver) it cancels a substantial portion of the valve closing force of the pressure in the seating chamber, and when the pressure energy in the unseating chamber is relatively low (jet submerged in the liquid) it then permits the then predominating force of the pressure in the seating chamber to move the valve to closed position.

It is another object of this invention to provide an automatic shut-off valve which, when installed as a level control valve, responds quickly and accurately to shut off the supply of incoming liquid when the liquid in the tank reaches a predetermined level.

It is another object of this invention to provide a jet assembly for an automatic shut-off valve that is of simple and efficient form to achieve transformation of pressure energy of a liquid by a nozzle to a velocity head of a jet and back to pressure energy by a receiver with minimum loss.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a cross-section view showing one form of automatic shut-off valve constituting the present invention, such section having been taken substantially along the line 1—1, FIG. 3;

FIGS. 2 and 3 are, respectively, top plan and bottom plan views of the valve; and FIGS. 4 and 5 are enlarged views of the jet nozzle and receiver (or pickup) assembly showing in one case (FIG. 4) how the unimpeded jet from the nozzle impinges on the receiver to transform the jet velocity head into pressure energy effective to actuate the valve to one position and showing in the other case (FIG. 5) how the velocity head of the jet is dissipated in the liquid in which it is submerged when the level of the liquid in the tank reaches the level of the jet.

Referring now more particularly to the drawing, the automatic shut-off valve 1 herein is shown by way of example only, as comprising a multi-part housing including a base part 2 formed with threaded openings 3 for mounting in a tank (not shown) in register with a filling opening thereof. The base part 2 is formed with an inlet port 4 provided with a valve seat 5 through which fluid is adapted to flow into the tank through the outlets 6 between the spider arms 7 of the upper ring-like portion 8.

The base part 2, intermediate part 9, and cap part 10 are clamped together as by means of screws 11 extending through said housing parts and having threaded engagement with the portion 8 of the base part 2. The peripheral portion of a laterally flexible diaphragm 12 is clamped between said intermediate and cap parts 9 and 10 to define a seating chamber 14 and an unseating chamber 15 for the main inlet valve 16.

The inlet valve 16 comprises a tubular stem 17 on which circular plates 18 and 19 are secured by nuts 20 and 21 having threaded engagement with said stem. Clamped between said plates 18 and 19 is a seat washer 23 of rubber or rubber-like material, the seat washer 23 having an annular seating rib 24 which is adapted to engage the valve seat 5 in fluid-tight manner when the valve 16 is in seated or closed position as shown in FIG. 1.

The tubular valve stem 17 is axially slide-guided in the bushing 25 in the intermediate part 9 and thus said intermediate part 9, in addition to providing the fixed wall of the pressure unseating chamber 15, constitutes a valve guide member.

The laterally flexible diaphragm 12 has its central portion secured to the upper end of the valve stem 17 by means of plates 26 and 27 which are clamped together between the collar 28 of the stem and the nut 29 threaded on the stem. As evident, the diaphragm 12 in effect constitutes a laterally enlarged head of the valve 16 which is the movable partition or wall of the opposed pressure seating and unseating chambers 14 and 15. Urging the valve 16 to seated position is a spring 30 which is compressed between the valve 16 and the cap part 10.

Secured to the cap part 10 in axially aligned, spaced apart relation are the jet nozzle 31 and the jet receiver 32, the upstream side of the nozzle 31 having fluid communication with the pressure-seating chamber 14 by way of the passage 34 in the nozzle holder 35 and cap part 10, and the downstream side of the receiver 32 having fluid communication with the pressure-unseating chamber 15 by way of the passage 36 which extends through the receiver holder 37 and through the cap part 10, diaphragm 12, and intermediate part 9 as shown.

From the foregoing, it can be seen that when it is desired to fill a tank with which the automatic shut-off valve 1 herein is associated, all that it is necessary to do is to communicate the inlet port 4 with a source of liquid under pressure, the liquid under pressure passing through the valve stem 17 into the pressure-seating chamber 14 and thence through the nozzle holder passage 34 and the orifice of nozzle 31. This establishes a jet, as best shown in FIG. 4, which impinges on the receiver 32, the velocity head of the jet J being transformed to pressure energy which builds up in the pressure-unseating chamber 15 by way of the passage 36. Accordingly, as hereinafter explained, because the liquid pressure in the pressure-seating chamber 14 and in the pressure-unseating chamber 15 are at this time approximately equal, depending upon the efficiency of the nozzle and receiver assembly, the inlet pressure acting upwardly on the area of diameter A of the valve 16 will be sufficient to overcome the downward force exerted by the spring 30 and the slight overbalance of the downward force in the pressure-seating chamber 14 on the area of diameter B over the upward force in the pressure-unseating chamber 15 on the same area. Therefore, the valve 16 will be moved upwardly away from the seat 5 to permit free flow of liquid into the tank via the inlet port 4 and outlets 6.

Now, as the tank is being filled, the level of the liquid will gradually rise, and when the level reaches the point where the jet J is submerged in the liquid the pressure energy at the receiver 32 and in the pressure-unseating chamber 15 will decrease to marked extent, since at that time only a small portion of the energy of the jet J will reach the receiver 32 as indicated in FIG. 5. When that occurs, that is, the reduction in pressure energy in the unseating chamber 15, the then predominating liquid pressure in the seating chamber 14 acting downwardly on the area B of the diaphragm 12, will overcome the unseating effect of the inlet liquid pressure acting on the area A of the seat 5, and this, obviously, will force the valve 16 to closed position, together with the assistance of spring 30, even though full line pressure continues to be applied at the inlet port 4.

It is to be noted that the present automatic shut-off valve 1 is of the "Fail-Open" type, that is to say, that in the event of rupture of the diaphragm 12, the valve 16 will remain open until the supply pressure in the inlet 4 is decreased to an extent that the spring 30 moves the valve 16 to closed position.

With reference to the details of the jet assembly, the jet nozzle 31 may be called an orifice with a rounded entrance and for the instant purposes an orifice diameter of .125" has been found satisfactory. The rounded entrance may have a radius of, for example, .05". Accordingly, the presence of liquid under presure in the passage 34 will cause a jet stream J of liquid to issue from the orifice, the rounded entrance serving to minimize the contraction of the jet J.

The jet receiver 32 is, as aforesaid, mounted in alignment with the jet nozzle 31 so that the jet J issuing from the nozzle 31 will impinge on the opening in the receiver 32, which opening also may be of .125" diameter, for example and preferably formed with a slightly rounded entrance, of say, .05" and having an extended flat end face as shown.

It has been found that the efficiency of this jet assembly is quite high. For example, with nozzle pressures from 10 to 20 p.s.i., and with distances of 1", 1½", 2", 2½", and 3" between the nozzle 31 and the receiver 32, the receiver pressure will be from nearly 10 to nearly 20 p.s.i.; from nearly 10 to 19.5 p.s.i.; from about 9 to 18.5 p.s.i.; from about 9 to 17.5 p.s.i. and from about 9 to 17 p.s.i., respectively. Accordingly, considering the jet assembly wherein the nozzle 31 and receiver 32 are spaced apart a distance of 2½", it will be seen that when the nozzle pressure is 10 p.s.i., the pressure in the pressure-unseating chamber 15 will be about 9 p.s.i., whereby this pressure differential of about 1 p.s.i. acting on the area B of the pressure seating chamber 14 plus the force of the spring will be effective to tend to hold the valve 16 against its seat 5 whereas, the entire line pressure of about 10 p.s.i. acts on the area A of the valve 16 to overcome such seating influence, and thus open the valve 16.

With jet arrangements as above-described, it has been found that when the jet J is submerged in a liquid such as fuel, the velocity head of the jet J is dissipated to substantial degree in the body of the liquid between the nozzle 31 and the receiver 32, this being shown in FIG. 5. With nozzle and receiver spacings as aforesaid, and with nozzle pressures from 10 to 20 p.s.i., the pressures at the receiver 32 and in the pressure unseating chamber 15 will be from 7 to 15 p.s.i. (1" spacing); from 4 to 12 p.s.i. (1½" spacing); from 2 to 5 p.s.i. (2" spacing); from 1.5 to 3 p.s.i. (2½" spacing) and from 1 to 2 p.s.i. (3" spacing).

Again taking for example the jet assembly in which the spacing between the nozzle 31 and receiver 32 is 2½", it will be seen that when the nozzle pressure is 10 p.s.i., the receiver pressure will only be 1.5 p.s.i. when the jet J is thus submerged. Likewise, when the nozzle pressure is increased from 10 p.s.i. to 20 p.s.i., the receiver pressure will increase from about 1.5 p.s.i. to about 3 p.s.i. In any case, regardless of the pressure in the nozzle 31 and thus in the seating chamber 14, there will exist a relatively large differential in pressure between that in the seating chamber 14 and in the unseating chamber 15 from 7.5 to 14.5 p.s.i., whereby the greater pressure acting on the diaphragm 12 in the pressure-seating chamber 14, together with the force of the spring 30, will overcome the opposing force of the inlet pressure acting on the smaller area A of the valve seat 5 and, therefore, the valve 16 will be forced against the seat 5 whenever the jet J is thus submerged.

It has been found that the arrangement described provides for very accurate sensing and control of tank filling operations within close limits with little overshoot. Moreover, it has been found that a certain amount of misalignment of the receiver 32 and nozzle 31 can be tolerated without seriously affecting the results.

It is to be understood that the automatic shut-off valve 1 herein may be mounted anywhere as desired. For instance, it may be mounted in the bottom of a tank preferably so that the nozzle and receiver orifices are in horizontal alignment. When the valve 1 is thus mounted in the bottom of a tank and it is desired to fill the tank to an appreciable depth, the nozzle and receiver holders 35 and 37 may be connected together in a separate housing near the top of the tank with tubes or flexible conduits interconnecting them with the respective seating and unseating chambers 14 and 15. The valve 1 herein may also be mounted in inverted position at the top of the tank with the inlet opening 4 registering with the filler opening of the tank. Likewise, the valve herein may be mounted on the side of a tank near the top or bottom with the nozzle 31 and receiver 32 preferably in horizontal position.

Although the present valve 1 is of the so-called "Fail-Open" type, it may be readily rearranged to convert it to the "Fail-Closed" type in which the rupturing of the diaphragm 12 causes the inlet valve 16 to be closed by the pressure of the liquid in the inlet 4. It is also contemplated to use the present valve as a transfer valve wherein liquid from one tank is transferred to another until he level in one of the tanks reaches a predetermined maximum or minimum.

Other modes of applying the principle of the invention may be employed, change being made as regards the details described, provided the features stated in any of the following claims, or the equivalent of such, be employed.

I therefore particularly point out and distinctly claim as my invention:

1. An automatic shut-off valve for use in filling a tank with liquid to a predetermined level comprising a housing formed with a passage for flow of liquid therethrough into the tank, such passage being formed with a valve seat whereby passage portions on opposite sides of said seat constitute an inlet port and an outlet port through which liquid is adapted to be introduced into the tank; a spring-closed valve member supported in said housing for movement into and out of engagement with said seat to thus close and open said passage; said housing and valve member defining a pressure unseating chamber of which a portion of said valve member constitutes a movable wall disposed so that liquid pressure therein of two different magnitudes acting on said movable wall is effective at the lower pressure to permit movement of said valve member into engagement with said seat, and at the higher pressure to move said valve member away from said seat; and a jet assembly operatively connected with said housing and adapted to be disposed in the region of the level to which the tank is to be filled; said jet assembly including a nozzle in liquid communication with said inlet port, and a receiver spaced from said nozzle and in liquid communication with said pressure unseating chamber, said receiver being arranged to have the jet of liquid emerging under pressure from said nozzle impinge thereon to transform the velocity head of the jet to pressure energy in the unseating chamber at such higher pressure and thus maintain the valve member in open position for flow of liquid into the tank through such passage until such time that a portion of the velocity head at said receiver is dissipated by submersion of the jet in the rising liquid level in the tank whereby there is a substantial loss of pressure energy in the unseating chamber to the aforesaid lower pressure which permits movement of said valve member to closed position to discontinue the tank filling operation.

2. The automatic shut-off valve of claim 1 wherein said jet assembly further comprises a nozzle holder and receiver holder fixedly mounted on said housing within said nozzle and receiver spaced apart a distance of from about 8 to 24 times the diameter of the nozzle orifice.

3. The automatic shut-off valve of claim 1 wherein said nozzle has an orifice with a rounded entrance.

4. The automatic shut-off valve of claim 1 wherein said receiver has an apertured end face that is normal to the axis of the nozzle orifice.

5. The automatic shut-off valve of claim 1 wherein said housing comprises a base part defining said inlet and outlet ports and said seat, and another part secured to said base part and defining said unseating chamber with said movable wall of said valve member.

6. An automatic shut-off valve for use in filling a tank with liquid to a predetermined level comprising a housing formed with a passage for flow of liquid therethrough, such passage being formed with a valve seat whereby passage portions on opposite sides of said seat constitute an inlet port and an outlet port; a valve member supported in said housing for movement into and out of engagement with said seat to thus close and open said passage; said housing being formed with a chamber, and said valve member having a portion thereof constituting a movable partition which subdivides said chamber into a pressure seating chamber and a pressure unseating chamber, said pressure seating chamber being in liquid communication with said inlet port and having one side of the movable partition thereof exposed to liquid under pressure in said inlet port on an area larger than the area of said seat, said pressure unseating chamber being disposed so that liquid pressure therein of two different magnitudes acts on the opposite side of said movable partition and thus is effective at the lower liquid pressure to permit seating of said valve member against the liquid pressure in said inlet port, and at the higher pressure to assist the liquid pressure in said inlet port in overcoming the seating effect of said seating chamber; and a jet assembly operatively connected with said housing and disposed at the predetermined level to which it is desired to fill a tank, said jet assembly including a nozzle in liquid communication with said inlet port, and a receiver spaced from said nozzle and in liquid communication with said pressure unseating chamber, said receiver being arranged to have the jet of liquid emerging from said nozzle impinge thereon to build up such higher pressure in said pressure unseating chamber and thus maintain said valve member in open position, until such time that the liquid level in the tank submerges the jet whereby there is a substantial loss of pressure in said pressure unseating chamber to the aforesaid lower pressure which permits the pressure in the pressure seating chamber to force said valve member against said seat to closed position to arrest further flow of liquid through such passage.

7. The automatic shut-off valve of claim 6 wherein said nozzle is in liquid communication with said inlet port by way of said seating chamber and an opening in said valve member leading from said inlet port to said seating chamber.

8. The automatic shut-off valve of claim 6 wherein said housing comprises a base part formed with said inlet and outlet ports and said seat, an intermediate part secured to said base part to constitute a guide for movements of said valve member and to form the fixed wall of said unseating chamber, and a cap part secured to said intermediate part to form the fixed wall of said seating chamber.

9. The automatic shut-off valve of claim 6 wherein said housing comprises a base part formed with said inlet and outlet ports and said seat, an intermediate part secured to said base part to constitute a guide for movements of said valve member and to form the fixed wall of said unseating chamber, and a cap part secured to said intermediate part to form the fixed wall of said seating chamber, said nozzle and receiver being connected to said cap part in spaced apart, aligned relation.

10. The automatic shut-off valve of claim 9 wherein said cap part has a passage leading from said receiver to said unseating chamber, a passage leading from said nozzle to said seating chamber, and wherein said valve member has an opening leading from said inlet port to said seating chamber.

11. In an automatic shut-off valve, the combination of a housing formed with a passage having a valve seat, said housing being adapted to be mounted in register with a filler opening of a tank for flow of liquid into the tank via said passage; a valve member supported in said housing for movement into and out of engagement with said seat to close and open said passage; a jet assembly operatively associated with said housing and disposed at the level to which it is desired to fill the tank, said valve member and housing defining a pressure seating chamber of which said valve member has one side thereof exposed to fluid under pressure in said passage tending to move said valve member into engagement with said seat, said valve member and housing also defining a pressure unseating chamber of which the opposite side of said valve member is exposed to the pressure energy evolved from the velocity head of a jet of liquid emerging from said jet assembly and tending to move said valve member out of engagement with said seat whereby said valve member may be moved to open position away from said seat under the influence of fluid pressure acting on said valve member on the area of said seat, the pressure energy of the velocity head of said jet being decreased upon the level of the liquid in the tank reaching the jet whereby the pressure in the pressure seating chamber is effective to move the valve member to seat-engaging position to shut off the further supply of liquid into the tank.

References Cited in the file of this patent
UNITED STATES PATENTS
2,333,044    Rosch _____ Oct. 26, 1943